INVENTORS.
RICHARD W. WHITNEY
LAWRENCE O. ROTH

ATTORNEYS

Sept. 29, 1970　　　R. W. WHITNEY ETAL　　　3,530,655
NUT HARVESTER
Filed Feb. 9, 1968　　　　　　　　　　　　　　　4 Sheets-Sheet 4
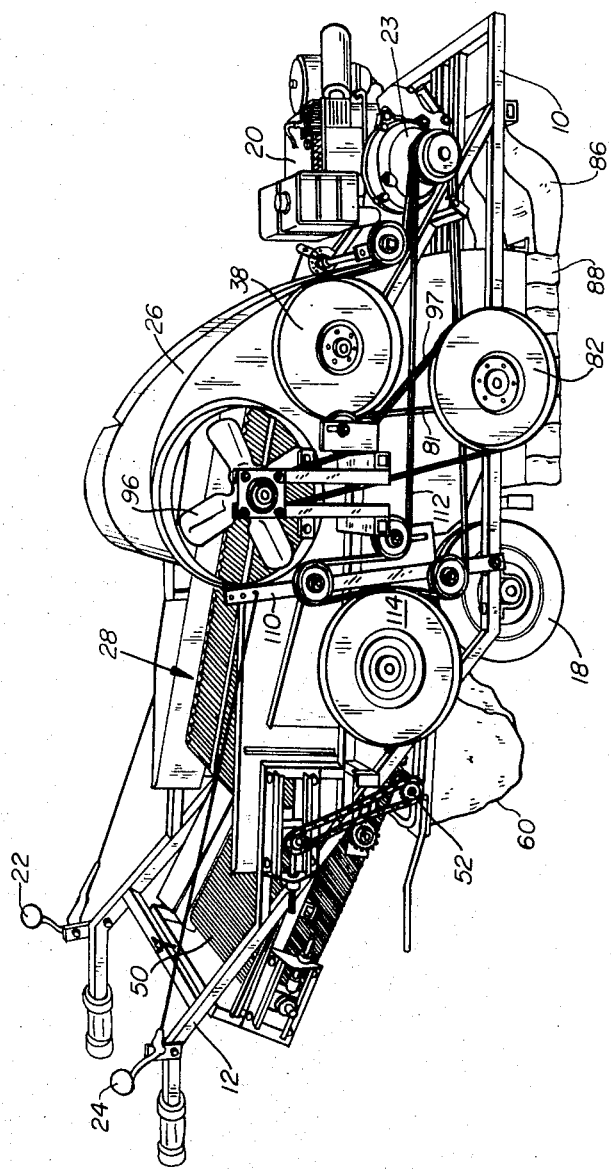
INVENTORS.
RICHARD W. WHITNEY
LAWRENCE O. ROTH
BY
Head & Johnson
ATTORNEYS – # United States Patent Office 3,530,655
Patented Sept. 29, 1970

3,530,655
NUT HARVESTER
Richard W. Whitney, 1107 E. 4th, and Lawrence O. Roth,
713 Pine St., both of Stillwater, Okla. 74074
Filed Feb. 9, 1968, Ser. No. 704,427
Int. Cl. A01g 19/00
U.S. Cl. 56—328                    2 Claims

ABSTRACT OF THE DISCLOSURE

Rubber sweep fingers direct nuts from the ground upward where they are diverted rearwardly upon a first conveyor. A transverse blower removes light trash with nuts and larger sticks conveyed to an inclined second belt separator designed to carry and remove heavier sticks and trash oppositely to the nuts which roll down the belt and collect in a removable hopper.

BACKGROUND OF THE INVENTION

This invention relates to fruit and specifically nut harvesting apparatus in which ground trash, including sticks, leaves, husks and dirt are separated from the fruit in a more efficient manner than that shown in the known prior art such as U.S. Pats. 3,131,526 and 3,261,152.

SUMMARY

Accordingly it is an object of this invention to provide a nut harvester which overcomes the complexity of prior known harvesters. As such, this invention further provides a mobil and preferably self-propelled device wherein resilient fingers in combination with a deflector pick up nuts and associated trash, directing same to a first conveyor. The first conveyor is comprised of spaced parallel bars transverse to the direction of the conveyor travel to permit some small trash to drop through. A blower directed transversely to the conveyor is operated at a velocity sufficient to blow remaining light trash therefrom, leaving the nuts and larger or heavier objects which drop upon a textured second conveyor which is canted at that angle whereby trash will continue to be carried upward by the action of the textured surface yet allowing the nuts to roll downward against the normal conveyor direction into a collection bag. A single power supply is adapted to operate a self-propelled drive system, the blower, sweeper and conveyor variably.

BRIEF DESCRIPTION OF THE DRAWINGS

FIG. 5 is a side view of the harvester of this invention depicting the various drive mechanisms and controls.

DESCRIPTION OF THE PREFERRED EMBODIMENTS

Figure 1:
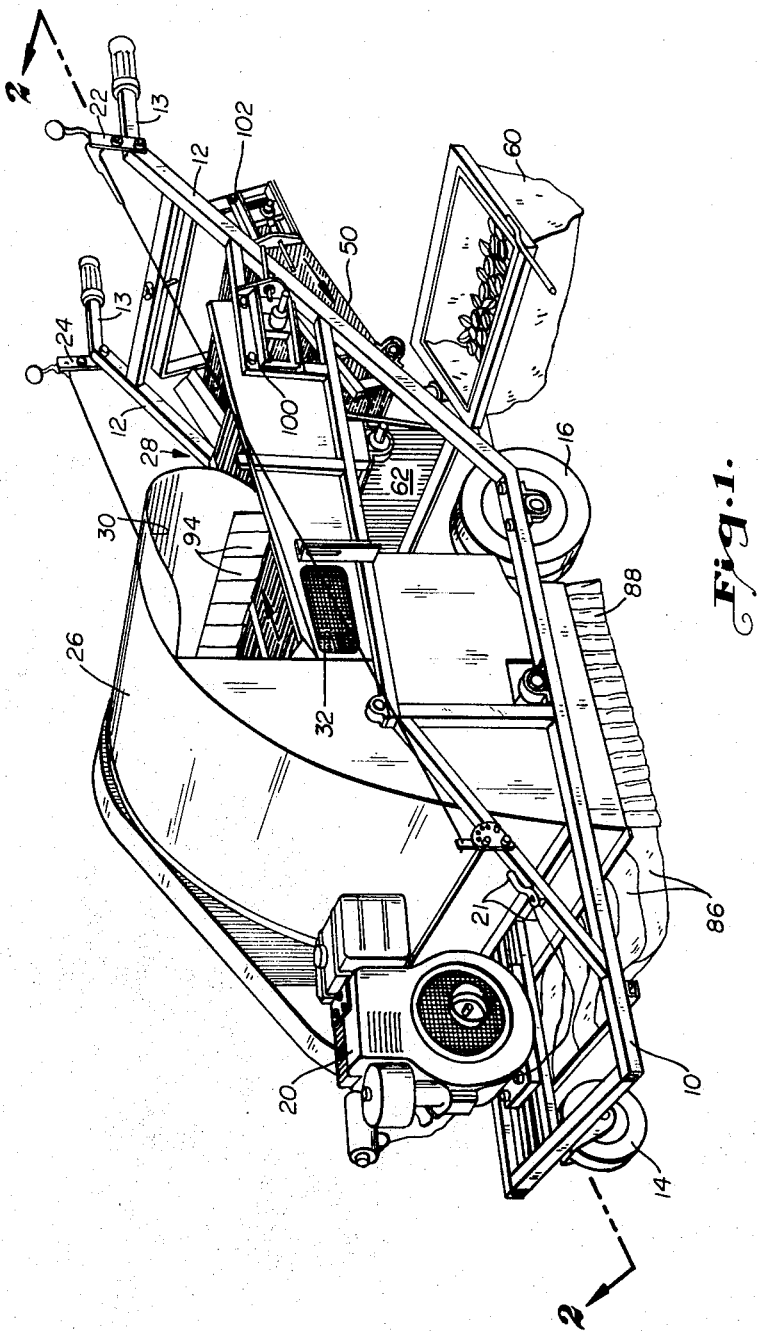
FIG. 1 is an overall perspective view of the nut harvester of this invention.

Referring now to the figures, the fruit or nut harvester of this invention includes a primary support frame having a substantially horizontally forward portion 10 which is structurally connected to upward and rearward members 12 which terminate with handle bars 13. Typically, the frame is supported upon the ground by a front caster wheel 14 and rear drive wheels 16 and 18, the latter of which provide self-propelled movement. A power supply 20, preferably an internal combustion engine, is adapted to drive all of the systems incorporated in the harvester. The variable speed drive 23, best shown in FIG. 5, is inclusive to provide operator control over the various functions herein described. Appropriate clutch control mechanisms 22 and 24 are on the handle bars adapted to provide operator control over the sweeper, blower, conveyor systems and self-propelled speed, respectively. A throttle control 21 is also provided as shown in FIG. 1.

A nut deflector housing 26 guides material including nuts, debris and other trash picked up from the ground across conduit 30 onto a first conveyor 28. Air blowing through conduit 30 across the material removes relatively light weight trash from the conveyor 28. An additional opening 32 is provided across the lower returning portion of the first conveyor 28 whereby any additional trash which is dropped through the conveyor may be blown or removed from the system. Otherwise the trash will fall to the ground behind the sweep blades 80.

The first conveyor is preferably constructed of a plurality of spaced rods, which rods are directed transversely to the direction of travel of conveyor 28. The spacing between each rod, preferably not more than about an inch, allows smaller trash and debris to fall through and/or be blown outwardly yet retaining the nuts to be harvested. As shown, the first conveyor is driven by belt pulley 38 and sprocket and shaft member 40 in the direction shown by the arrows in FIG. 2. Idler sprockets and shaft 36 and 37 allow greater air movement under and through the conveyor, and preferably cant the conveyor slightly upwardly-rearwardly.

Figure 2:
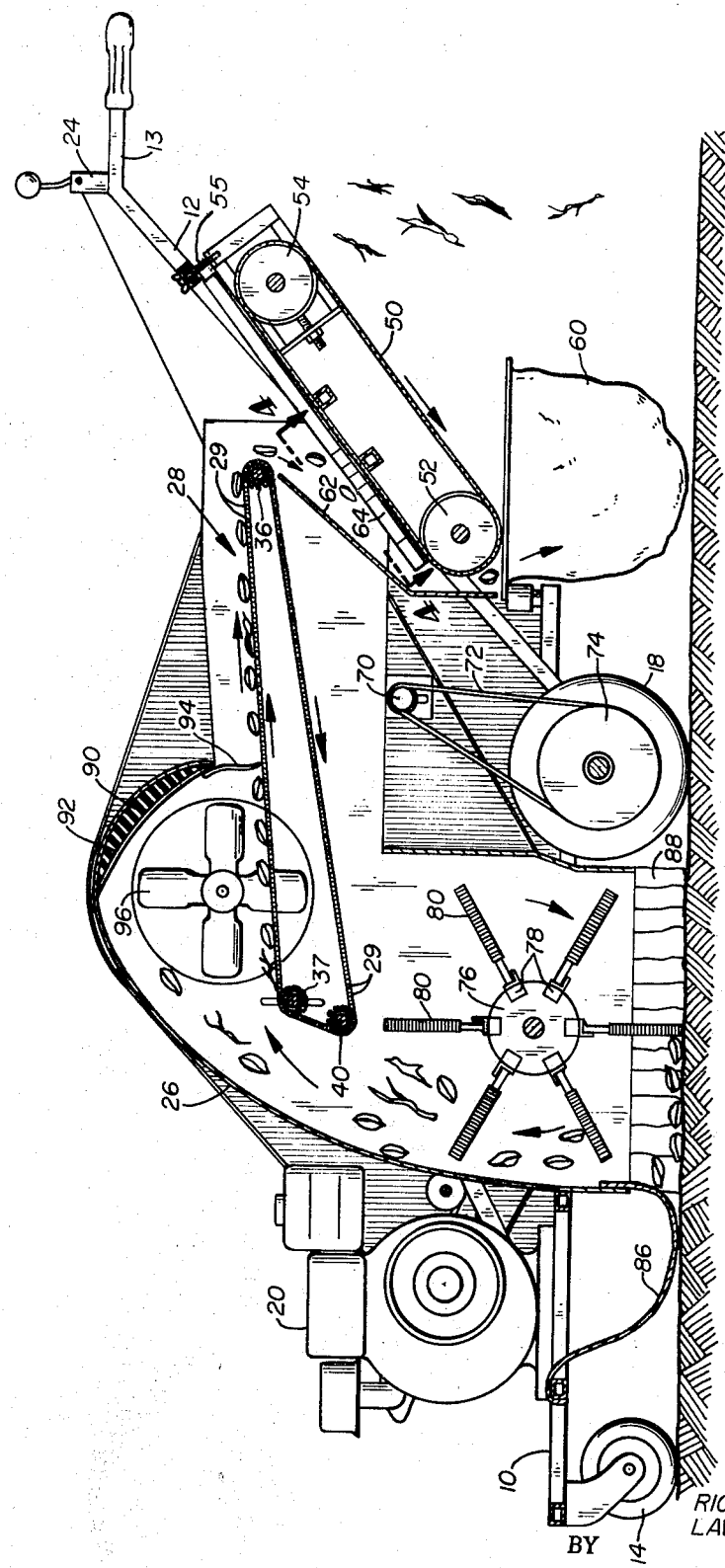
FIG. 2 is a sectional view taken along the line 2—2 of FIG. 1.
Figure 3:
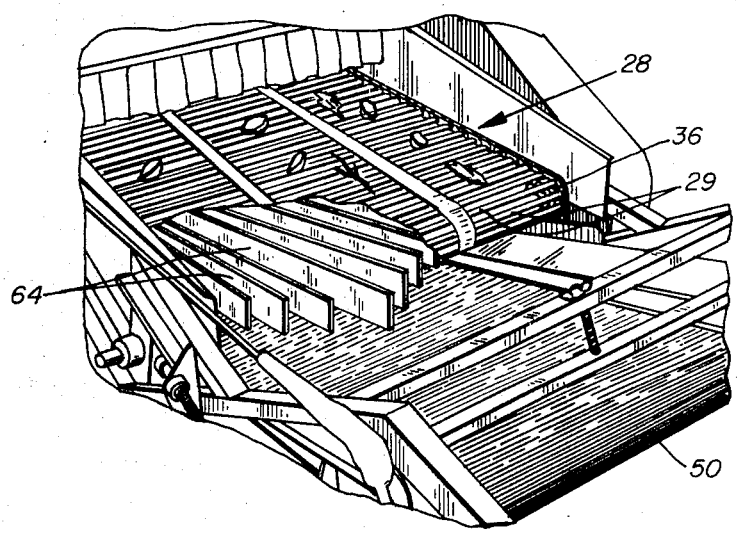
FIG. 3 is a partial sectional view showing the relationship and construction of the conveyance systems.
Figure 4:
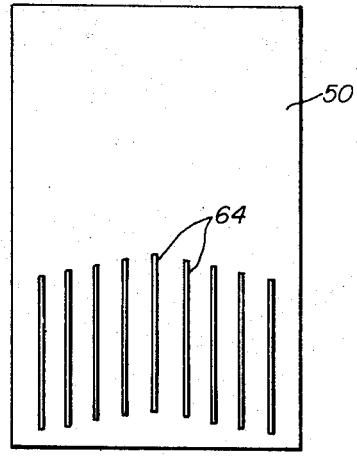
FIG. 4 is a partial sectional view taken along the line 4—4 of FIG. 2.

A second conveyor belt 50 is adjustably positioned upon the angular and rearward support frame 14 below the rearward end of conveyor 28 to receive nuts and any remaining large sticks or trash. The second conveyor 50 is driven by sprocket and shaft 52 around an adjustable idler sprocket 54 to vary the tension on the continuous belt-type conveyor 50. The second conveyor is a rubber belting-like material, that is, it is flexible to be formed into an endless belt and is textured on its conveying surface. Typically, belting material sold by Globe Belting Company under the trademark "Kling-Top" has been found to be preferred. Preferably, the angular position of the conveyor in combination with the textured surface is such that it will allow smooth objects (nuts) to roll down the incline, against the conveyor movement, into collection bag 60 as they may be deflected by plate 62. On the other hand, objects which have irregularities or surface projections (sticks and other debris) will cling to the textured belt surface and be carried with the conveyor movement to the upper rearward end of the belt thence to the ground, as shown in FIG. 2. To further assist in this separation, stick straighteners 64 are best shown in FIGS. 3 and 4, utilized to align the irregular objects upon the belt to assist in their removal. The purpose of the straighteners is to cause those sticks which tend to roll down the belt to turn so that they lie longitudinally parallel with the direction of the belt where they are stable and hence carried upward and over with the belt.

The self-propelled drive system as shown in FIG. 2 includes a drive shaft and sprocket 70, chain drive 72 and driven sprocket 74 which is attached to drive wheel 18 and hence provide self-propelled motion, by clutch control rod 24. The rod pivots bar 110 which changes the tension of belt 112 from the power supply 23 upon drive pulley 114. The harvester has a differential on the driven wheel shaft which permits powered turning by simply steering the machine with the handles.

Within the deflector housing adjacent the ground is sweep cylinder 76 which includes circumferentially spaced rows 78 within each row of which are a plurality of flexible rubber fingers 80. The cylinder is driven as shown in FIG. 5, by belt 81 around driven pulley 82. The belt 81 also drives pulley 38 of the first conveyor. The sweep cylinder is adjustable wherein fingers 80 will rake the ground to cause nuts and other loose debris to be flicked upward into the deflector housing 26. A plurality of flexible fabric strip members 86 are mounted across the front of the machine forwardly of the sweep fingers. These function to pass over material on the ground encountered by the device, yet maintain a seal to prevent swept material, deflected by fingers 80, from passing forward. In addition, flexible skirt members 88 are provided around the lower edge of the deflector housing to assist in confining the material to be swept. Swept nuts and debris are deflected upwardly as shown in FIG. 2, with some velocity within the deflector housing 26, some of which will strike an energy absorber member 90 which is a preferably resilient foam rubber or other similar material covered by a protective canvas 92. Here, the swept material is reduced in its velocity and directed downwardly upon the first conveyor 28 which is moving in direction shown. A plurality of flexible seal members 94 are positioned between the upper end of the deflector housing and the first conveyor belt 28. A blower fan 96 is mounted at the side of the harvester, being driven by suitable power takeoff belt 97 from sweep cylinder drive pulley 82 as shown in FIG. 5. The blower is adapted to blow relatively light weight trash and debris outwardly through opening 30 and/or opening 32, the latter for that trash which drops through the grid-chain conveyor 28 into the lower portion. Suitable adjustment devices 100 and 102 are provided with the mechanisms relative to the first and second conveyor belts in order to adjust not only the tension but their angular position relative to each other. It has been found that the second conveyor 50 operates satisfactorily at an angle of about 45° to the horizontal although this is adjustable. When the trash is heavy, the belt is tilted by means of the supporting bolt 55 shown in FIG. 2.

Protective covers and screens, not shown, are provided over the various drive belts, pulleys, and blower fan as a safety precaution.

As shown in FIG. 1 the hopper bag 60 is pivotal about the frame to an outward position for removal of the hopper and/or nuts.

The invention has been described with reference to specific and preferred embodiments. It will be apparent, however, that other modifications can be made without departing from the spirit and the scope of the invention. For example, one modification includes positioning the fan or blower to direct air forwardly across the nuts and trash as they drop from the first conveyor to the second as a "winnowing" separation of the lighter trash from the nuts and sticks. As such, the first conveyor would be a rubber-canvas belt having vlucanized cleats to collect and carry the initial swept material. Accordingly this invention should be construed not to be limited to the embodiment herein described but should be limited only by the scope of the appended claims.

What is claimed is:
1. A nut harvester comprising:
   a frame supported upon wheels for movement in a direction along the ground;
   a sweep cylinder including a plurality of rows transverse to said direction, each row including a plurality of resilient sweep fingers, said cylinder rotatable and adjustable so that said fingers will rake said ground and deflect material, including nuts to be harvested and incident trash, forwardly and upwardly;
   a deflector housing to direct said material upwardly and rearwardly;
   a first conveyor to receive said material and carry same rearwardly;
   a blower to direct high velocity air across said first conveyor;
   a second conveyor below said first conveyor at the rearward end thereof to receive said nuts and unremoved trash, said second conveyor operating in the same direction as said first conveyor and having a textured surface and canted at an angle to permit said nuts to roll downward against the direction of conveyor movement and off one end yet carry remaining trash upward with the direction of movement for disposal off the other end;
   a plurality of spaced parallel trash alignment members contiguous to said second conveyor, said members in alignment with the direction of movement of said second conveyor; and
   means to controllably propel said harvester and drive said sweep cylinder, first and second conveyors and blower.

2. A nut harvester comprising:
   a frame supported upon wheels for movement in a direction along the ground, said frame terminating rearwardly with handle bars for operator control;
   a sweep cylinder including a plurality of rows transverse to said direction, each row including a plurality of resilient sweep fingers, said cylinder rotatable and adjustable so that said fingers will rake said ground and deflect material, including nuts to be harvested and incident trash, forwardly and upwardly;
   a deflector housing to direct said material upwardly and rearwardly, said deflector housing includes a lower forward flexible seal adopted to traverse over ground objects yet prevent deflected material from traversing forwardly of said housing, said seal includes a plurality of strips attached to said frame and housing substantially parallel to said direction, each strip draping vertically from said housing downwardly toward said ground thence slightly upwardly and forwardly;
   a blower to direct high velocity air across said first conveyor;
   said deflector housing further including an energy absorbing portion to cause said material to drop upon said first conveyor transverse to said high velocity air;
   a first conveyor to receive said material and carry same rearwardly, said first conveyor comprises spaced parallel rods, said rods in a direction parallel to the direction of said high velocity air;
   a second conveyor below said first conveyor at the rearward end thereof to receive said nuts and unremoved trash, said second conveyor operating in the same direction as said first conveyor and having a textured surface and canted at an angle to permit said nuts to roll downward against the direction of conveyor movement and off one end yet carry remaining trash upward with the direction of movement for disposal off the other end;
   a plurality of spaced parallel trash alignment members contiguous to said second conveyor, said members in alignment with the direction of movement of said second conveyor; and
   means to controllably propel said harvester and drive said sweep cylinder, first and second conveyors and blowers.

References Cited
UNITED STATES PATENTS

| | | | |
|---|---|---|---|
| 1,808,928 | 6/1931 | Lint | 56—328 |
| 2,780,904 | 2/1957 | Bowie et al. | 56—328 |
| 3,105,343 | 10/1963 | Anderson et al. | 56—328 |
| 3,131,526 | 5/1964 | Burnham | 56—328 |
| 3,193,998 | 7/1965 | Fredriks | 56—328 |
| 3,407,581 | 10/1968 | Wild | 56—328 |

LOUIS G. MANCENE, Primary Examiner

J. A. OLIFF, Assistant Examiner